United States Patent
Wu et al.

(10) Patent No.: US 9,524,078 B2
(45) Date of Patent: Dec. 20, 2016

(54) SYSTEM AND METHOD FOR MANAGING OBJECTS IN A MULTIMEDIA CONTAINER

(71) Applicant: RAKUTEN KOBO, INC., Toronto (CA)

(72) Inventors: James Wu, Newmarket (CA); Robin Bennett, Beeton (CA); Daniel Hill, Toronto (CA); Anya Galkina, Toronto (CA)

(73) Assignee: RAKUTEN KOBO, INC., Toronto (CA)

( * ) Notice: Subject to any disclaimer, the term of this patent is extended or adjusted under 35 U.S.C. 154(b) by 185 days.

(21) Appl. No.: 13/901,429

(22) Filed: May 23, 2013

(65) Prior Publication Data

US 2014/0351751 A1    Nov. 27, 2014

Related U.S. Application Data

(60) Provisional application No. 61/697,077, filed on Sep. 5, 2012.

(51) Int. Cl.
*G06F 3/0482* (2013.01)
*H04N 21/234* (2011.01)
(Continued)

(52) U.S. Cl.
CPC ...... *G06F 3/0482* (2013.01); *H04N 21/23412* (2013.01); *H04N 21/47205* (2013.01); *H04N 21/47217* (2013.01); *H04N 21/8545* (2013.01)

(58) Field of Classification Search
CPC .................... G06F 17/30864; G06F 17/30011; G06F 17/30253
See application file for complete search history.

(56) References Cited

U.S. PATENT DOCUMENTS 7,689,933 B1* 3/2010 Parsons ................. G06F 3/0482
 715/200
8,156,437 B2* 4/2012 Karasawa ............. G06F 3/0486
 715/201
(Continued)

OTHER PUBLICATIONS

Chevalier et al; WikipediaViz: Conveying Article Quality for Casual Wikipedia Readers; © 2010; IEEE; 8 pages.*
(Continued)

*Primary Examiner* — Linh K Pham
(74) *Attorney, Agent, or Firm* — Oblon, McClelland, Maier & Neustadt, L.L.P.

(57) ABSTRACT

A system and method for managing objects in a multimedia container. The method includes displaying, on a mobile device, a piece of content; receiving an indication the piece of content is to be added to a subsequently identified multimedia container; displaying a list of a plurality of multimedia containers, wherein each of the multimedia containers is operable to comprise a plurality of media types; receiving an indication identifying a selected multimedia container; and displaying an indication that the piece of content has been added to the selected one of the plurality of multimedia containers. The method can further comprise: determining an image corresponding to the piece of content; and modifying a datastore corresponding to the selected multimedia container. Determining of the image corresponding to the piece of content can comprise accessing a book cover image, determining a rendering of a website, etc. The mobile device can be a tablet computing device.

21 Claims, 9 Drawing Sheets

(51) Int. Cl.
*H04N 21/472* (2011.01)
*H04N 21/8545* (2011.01)

(56) References Cited

U.S. PATENT DOCUMENTS

| | | | | |
|---|---|---|---|---|
| 8,817,053 B2* | 8/2014 | Robert | ............... | G06F 17/30126 |
| | | | | 345/660 |
| 2005/0216864 A1* | 9/2005 | Dart | ................... | G06F 3/04817 |
| | | | | 715/839 |
| 2008/0046818 A1* | 2/2008 | Orgill | .................... | G06F 15/16 |
| | | | | 715/700 |
| 2008/0307350 A1* | 12/2008 | Sabatelli | ............... | G06F 3/0481 |
| | | | | 715/779 |
| 2009/0222767 A1* | 9/2009 | Matthews | ............. | G06F 3/0482 |
| | | | | 715/835 |
| 2010/0192065 A1* | 7/2010 | Se | .......................... | G06F 3/0482 |
| | | | | 715/719 |
| 2011/0041096 A1* | 2/2011 | Larco | ....................... | G06F 3/0482 |
| | | | | 715/835 |
| 2011/0145764 A1* | 6/2011 | Higuchi et al. | ............... | 715/835 |
| 2011/0167159 A1* | 7/2011 | Bethlehem | ............ | H04L 63/102 |
| | | | | 709/226 |
| 2011/0314424 A1* | 12/2011 | Gusmorino | ......... | G06F 3/04817 |
| | | | | 715/846 |
| 2012/0014674 A1* | 1/2012 | Knight | ................ | G11B 27/034 |
| | | | | 386/328 |
| 2012/0095822 A1* | 4/2012 | Chiocchi | ............ | G06Q 30/0207 |
| | | | | 705/14.26 |
| 2012/0198379 A1* | 8/2012 | Kim et al. | ..................... | 715/776 |
| 2012/0266093 A1* | 10/2012 | Park | ....................... | G06F 3/0486 |
| | | | | 715/769 |
| 2013/0151981 A1* | 6/2013 | Green | ................... | G06F 3/0484 |
| | | | | 715/744 |
| 2013/0332831 A1* | 12/2013 | Birnkrant et al. | ............ | 715/719 |
| 2013/0346981 A1* | 12/2013 | Johnson | ............... | G06Q 10/109 |
| | | | | 718/100 |
| 2014/0068755 A1* | 3/2014 | King | ....................... | G06F 21/53 |
| | | | | 726/19 |
| 2014/0075515 A1* | 3/2014 | McColgan | ............. | H04L 67/26 |
| | | | | 726/4 |
| 2014/0115508 A1* | 4/2014 | Maclean | ............... | G06F 3/0483 |
| | | | | 715/764 |

OTHER PUBLICATIONS

Nadamoto et al., Gist of a Thread in Social Network Services Based on Credibility of Wikipedia, © 2011; IEEE; 10 pages.*
Singhal et al., Automating Document Annotation Using Open Source Knowledge; © 2013; IEEE; 6 pages.*
Zeng et al., Improving Retrieval Performance with Wikipedia's Category Knowledge; © 2012, IEEE; 4 pages.*

* cited by examiner

600

650

700

SYSTEM AND METHOD FOR MANAGING OBJECTS IN A MULTIMEDIA CONTAINER

CROSS REFERENCE TO RELATED APPLICATIONS

This application claims the benefit of and priority to the copending provisional patent application, Ser. No. 61/697,077, entitled "SYSTEM AND METHOD OF PROVIDING A USER INTERFACE ON A MOBILE DEVICE," with filing date Sep. 5, 2012, and hereby incorporated by reference in its entirety.

This application is related to non-provisional patent application, Ser. No. 13/901,363, entitled "SYSTEM AND METHOD FOR A MULTIMEDIA CONTAINER," with filing date May 23, 2013, and hereby incorporated by reference in its entirety.

This application is related to non-provisional patent application, Ser. No. 13/901,4165, entitled "SYSTEM AND METHOD FOR DISPLAYING A MULTIMEDIA CONTAINER," with filing date May 23, 2013, and hereby incorporated by reference in its entirety.

This application is related to non-provisional patent application, Ser. No. 13/901,498, entitled "SYSTEM AND METHOD FOR A HOME MULTIMEDIA CONTAINER," with filing date May 23, 2013, and hereby incorporated by reference in its entirety.

FIELD OF THE INVENTION

Embodiments of the present invention are generally related to graphical user interfaces that may be part of a mobile operating system.

BACKGROUND

As computing technology has advanced, computers have become smaller and more portable thereby bringing about powerful handheld devices capable of performing functions of more traditional computing technology. At the same time operating systems for handheld devices or mobile devices have been developed to better suit handheld devices. Such operating systems have conventionally been focused around applications. For example, upon turning on a handheld device, the user is presented with a fixed grid of icons of representing applications that the user can choose from.

In such an application or "app centric" interface, a user's content is accessed by first accessing an application for the type of content and then selecting the desired piece of content. For example, in order for a user to access music, a music application is launched and then the desired music is selected for playback. Similarly, in order for a user to browse a website, a web browser is launched and the user enters or selects the desired website or URL (uniform resource locator). In other words, mobile operating systems are focused on or centered around applications and a user enters an application in order to access or consume content.

SUMMARY OF THE INVENTION

Accordingly, what is needed is a solution to allow a user to access content without having to first select an application in order to access the content. Embodiments of the present invention are operable to allow content and applications to be organized in a multimedia container. The multimedia container may comprise pieces of content, applications, widgets, etc. The multimedia container is displayed via a graphical user interface that allows a user to select content for access instead of selecting an application and then selecting the desired content. Embodiments of the present invention allow users to organize their content based on specific interests or life events rather than organizing their content separately within each application. Embodiments of the present invention thereby allow a user to access content without going separately to a variety of applications. Embodiments of the present invention further allow pieces of content and applications to be organized according to a common theme while being from different data types. Embodiments of the present invention thus allow a user to navigate content and applications instead of just navigating applications. Embodiments of the present invention thereby allow for a more personalized experience with a device (e.g., mobile device). Embodiments of the present invention further allow a user to organize content according to his or her interests and reorganize the content as his or her interests change.

In one embodiment, a method for displaying a portion of a graphical user interface comprises: displaying, on a mobile device, a piece of content; receiving an indication the piece of content is to be added to a subsequently identified multimedia container; displaying a list of a plurality of multimedia containers, wherein each of the multimedia containers is operable to comprise a plurality of media types; receiving an indication identifying a selected multimedia container; and displaying an indication that the piece of content has been added to the selected one of the plurality of multimedia containers. In one exemplary implementation, the method further comprises: determining an image corresponding to the piece of content; and modifying a datastore corresponding to the selected multimedia container. Determining of the image corresponding to the piece of content can comprise accessing a book cover image. Determining of the image corresponding to the piece of content can comprise determining a rendering of a website. The mobile device can be a tablet computing device. The selected multimedia container can be operable to comprise various things (e.g., an application, a widget, etc.). The list of the plurality of multimedia containers can be in a hierarchical format.

In one embodiment, a computer-readable storage medium having stored thereon, computer executable instructions that, if executed by a computer system cause the computer system to perform a method for displaying a graphical user interface. The method comprises: displaying, on a mobile device, a piece of content; receiving an indication the piece of content is to be added to a subsequently created multimedia container; displaying an option to create the multimedia container; receiving an indication to create the multimedia container, wherein the multimedia container is operable to comprise a plurality of media types; displaying an option to select a label of the multimedia container; receiving an indication of a selected label of the multimedia container; determining an image corresponding to the piece of content; and storing the selected label of the new multimedia container and the image into a datastore corresponding to the multimedia container. In one exemplary implementation, the method further comprises displaying a list of a plurality of multimedia containers. The list of the plurality of multimedia containers can be in a hierarchical format. The determining of the image corresponding to the piece of content can comprise a variety of things (e.g., accessing a book cover image, accessing a frame of a video, determining a rendering of a website, etc.). The image can comprise an indicator of a rendering operation operable to be performed on the piece of content. The mobile device can be a tablet.

In one embodiment, a system for displaying a graphical user interface comprises: a content display module operable to display a piece of content, wherein the content display module is operable to execute on a mobile device; a indicator processing module operable to receive an indication the piece of content is to be added to a subsequently identified multimedia container; a display module operable to display a list of a plurality of multimedia containers; a selection module operable to receive an indication identifying a selected multimedia container; and a datastore module operable to update a datastore corresponding to the selected multimedia. In one exemplary implementation, the system further comprises an image determination module operable to determine an image corresponding to the piece of content. The list of the plurality of multimedia containers can be in a hierarchical format corresponding to a hierarchy of the plurality of multimedia containers. In one exemplary implementation, the image determination module is operable to determine access a book cover image when the piece of content is a book.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
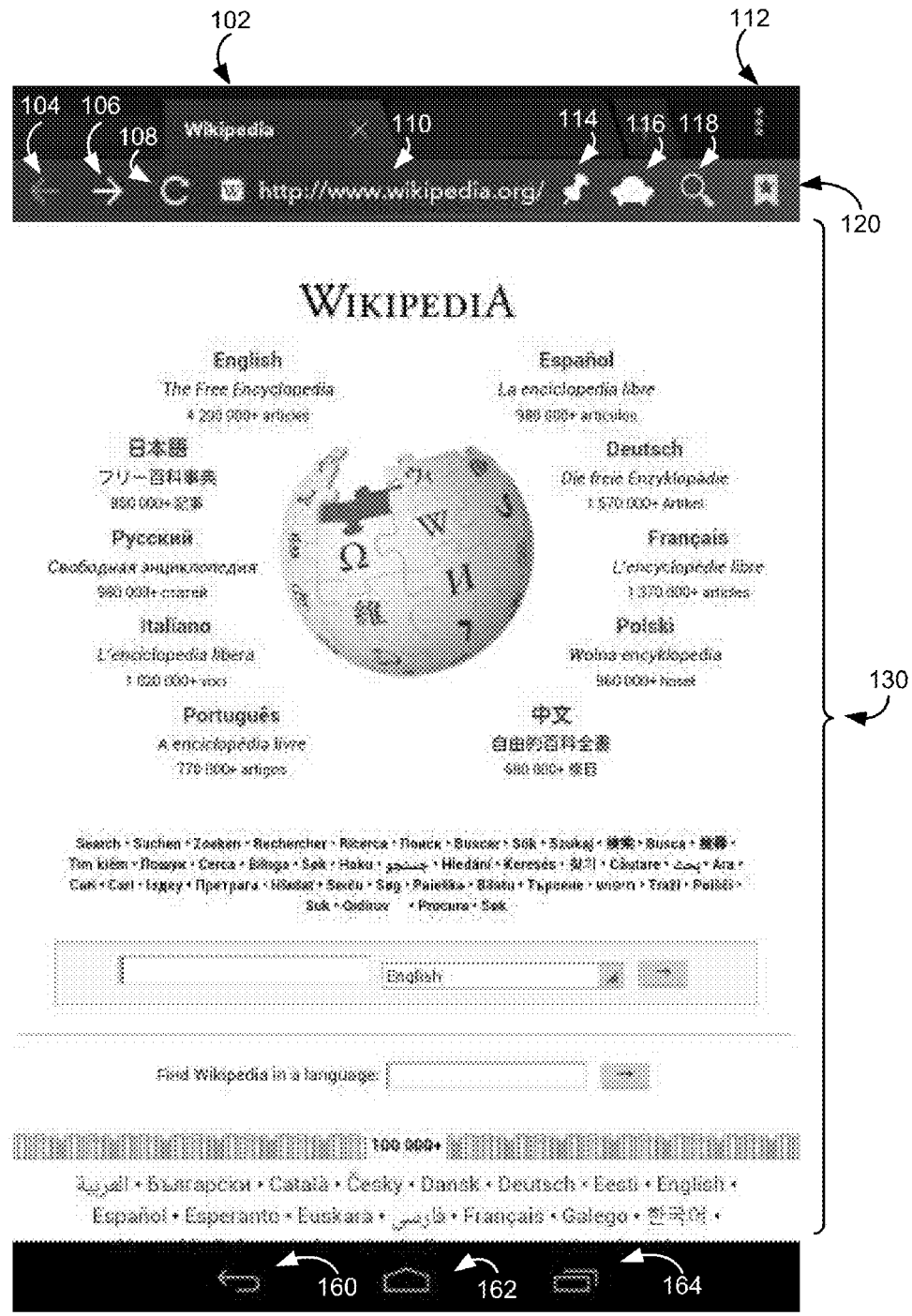
FIG. 1 shows an exemplary graphical user interface of an application operable for adding an object to a multimedia container in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation And Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., system 900 of FIG. 9), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Systems and Methods for Managing Objects in a Multimedia Container

Embodiments of the present invention are operable to allow content and applications to be organized in a multimedia container. The multimedia container may comprise pieces of content, applications, widgets, etc. The multimedia container is displayed via a graphical user interface that allows users to select content for access instead of selecting an application and then selecting the desired content. Embodiments of the present invention allow a user to organize their content based on specific interests or life events rather than organizing their content separately within each application. Embodiments of the present invention thereby allow a user to access content without going separately to a variety of applications. Embodiments of the present invention further allow pieces of content and applications to be organized according to a common theme while being from different data types. Embodiments of the present invention thus allow a user to navigate content and applications instead of just navigating applications. Embodiments of the present invention thereby allow for a more personalized experience with a device (e.g., mobile device). Embodiments of the present invention further allow a user to organize content according to his or her interests and reorganize the content as his or her interests change.

Embodiments of the present invention allow a user to organize content in the context of their activities and interests. For example, a user planning a vacation may add a plurality of websites useful for planning the vacation, add a couple of books to bring on the vacation, add some songs to bring on the vacation, and add some videos for entertaining children. As another example, a user interested in cars could create a multimedia container for cars and add books about cars and Formula One drivers, add video links of videos about cars, and links to various car forums that the user participates in.

Embodiments of the present invention further allow leveraging of general human tendency to be visual. Humans can often times recognize shapes, structures, colors, or patterns faster than they can read a title. For example, it may be easier to scan across a space and identify something visually from its color, shape, or pattern of an image as well as identify where the image is located. Embodiments of the present invention thereby help users find content in a space quickly and with more context.

FIGS. 1-7 and 9 illustrate example components used by various embodiments of the present invention. Although specific components are disclosed in FIGS. 1-7 and 9, it should be appreciated that such components are exemplary. That is, embodiments of the present invention are well suited to having various other components or variations of the components recited in FIGS. 1-7 and 9. It is appreciated that the components in FIGS. 1-7 and 9 may operate with other components than those presented, and that not all of the components of FIGS. 1-7 and 9 may be required to achieve the goals of embodiments of the present invention.

Embodiments of the present invention are operable to allow adding different kinds of media from disparate locations (e.g., from across the internet) to a multimedia container. Embodiments of the present invention are operable to create visual "bookmarks" representing content and allowing a user to access the content based on the visual bookmark. Embodiments of the present invention further allow a user to be able to organize and collect content in a way that makes sense to the user.

FIG. 1 shows an exemplary graphical user interface of an application operable for adding an object to a multimedia container in accordance with one embodiment of the present invention. FIG. 1 depicts an exemplary interface of web browser operable for adding an object to a multimedia container.

Exemplary graphical user interface 100 comprises tab 102, back button 104, forward button 106, refresh button 108, website address area 110, pin button 114, readability button 116, search button 118, actions button 112, bookmarks button 120, and website area 130, and control buttons 160-164.

Tab 102 corresponds to a tab of the browser for the website currently being viewed. Back button 104 allows for navigation to a previously accessed website. Forward button 106 allows for navigation to a previously accessed website. Refresh button 108 allows for reloading of a webpage. Website address area 110 displays the current website address and allows entry and editing of website addresses. Readability button 116 invokes a function of reading a website in a full screen mode. Search button 118 allows a user to search the Internet. Bookmarks button 120 allows a user to view bookmarks. Website area 130 displays a website (e.g., rendered by a web browser engine). Actions button 112 allows a user to invoke particular features of an application.

Control icons 160-164 are operable for navigation of a plurality of multimedia containers and switching applications. Back control 160 is operable for navigation to a previous multimedia container. Home control 162 is operable for navigating to a home multimedia container. Recent apps button 164 is operable to invoke a function for changing applications.

Pin button 114 allows a user to "pin" or add a website to a multimedia container or tapestry. Upon selecting pin button 114, a user may be presented with a menu allowing a user to pin or add the current website to a multimedia container or save the website to a collection of bookmarks. In one embodiment, selection of pin button 114 results in a user being presented with a dialog box for adding the item to a multimedia container (e.g., FIG. 5).

It is appreciated that a variety of applications may have a share button (e.g., share button 326) providing access to pin functionality (e.g., pin to tapestry button 402) or a pin button 114 including, but not limited to, a photoviewer, a video player, a music player, a book application, etc.

Figure 2:
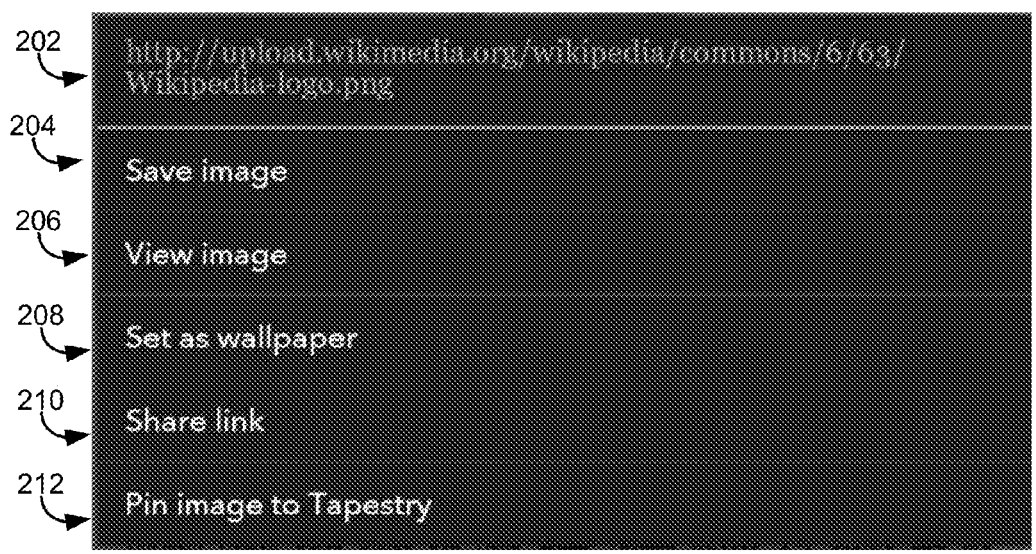
FIG. 2 shows an exemplary dialog box operable for adding and object to a multimedia container in accordance with one embodiment of the present invention.

FIG. 2 shows an exemplary dialog box operable for adding an object to a multimedia container in accordance with one embodiment of the present invention. FIG. 2 depicts an exemplary dialog box presented in relation to an image (e.g., upon a user pressing and holding on an image in a web browser).

Exemplary dialog box 200 comprises website address area 202, save image button 204, view image button 206, set as wallpaper button 208, share link button 210, and pin image to tapestry button 212. Website address area 202 comprises an address of the image. Save image button 204 allows a user to save the image (e.g., to local or remote storage). View image button 206 allows a user to view the just the image (e.g., separate from the website). Set as wallpaper button 208 allows a user to set the image to be a wallpaper (e.g., of a multimedia container). Share link button 210 allows a user to share a link to the image. Pin image to tapestry button 212 allows a user to "pin" or add the image to a multimedia container. A multimedia container is a graphically navigable container that is operable to hold various objects of various media types, applications, and widgets. In one embodiment, an exemplary implementation of a multimedia container is a tapestry available from Kobo Inc. of Toronto, Canada. In one embodiment, selection of pin to tapestry button 212 results in a user being presented with a dialog box for adding the item to a multimedia container (e.g., FIG. 5).

Figure 3:
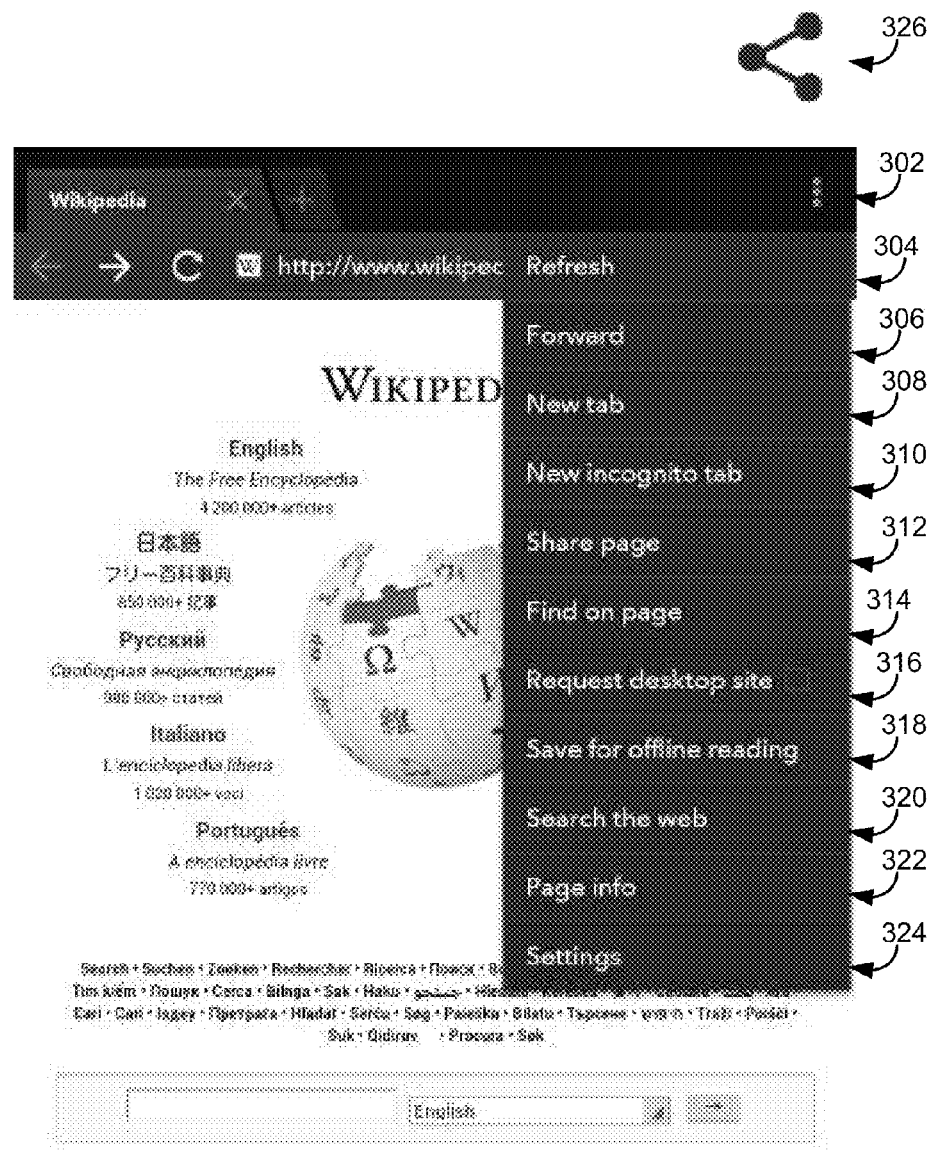
FIG. 3 shows an exemplary action menu operable for adding an object to a multimedia container in accordance with one embodiment of the present invention.

FIG. 3 shows an exemplary action menu operable for adding an object to a multimedia container in accordance with one embodiment of the present invention. FIG. 3 depicts an action menu of a web browser. It is appreciated that an actions menu substantially similar to that shown in FIG. 3 may be presented by a variety of applications and options of the action menu may be configured by an operating system.

Graphical user interface 300 shows a selected actions menu (e.g., selected via actions button 302). The selected actions menu comprises refresh button 304, forward button 306, new tab button 308, new incognito tab button 310, share page button 312, find on page button 314, request desktop site button 316, save for offline reading button 318, search the web button 320, page info button 322, and settings button 324.

Refresh button 304 allows for reloading of a webpage. Forward button 306 allows for navigation to a previously accessed website. New tab button 308 allows creation or opening of a new tab for browsing the Internet. New incognito tab button 310 allows launch of a privacy mode. Find on page button 314 allows a user to launch a search function for the website currently being displayed. Request desktop site button 316 allows a desktop version of a website to be requested. Save for offline reading button 318 allows a user, search the web button 320, page info button 322, and settings button 324

Share page button 312 allows a user to share a website or add a website to a multimedia container. In one embodiment, selection of share page button 312 causes a dialog box comprising various sharing options to be displayed (e.g., FIG. 4).

Graphical user interface 300 may optionally include a share button 326. Share button 326 allows a user to share a piece of content. In one embodiment, selection of share button 326 causes a dialog box comprising various sharing options to be displayed (e.g., FIG. 4).

Figure 4:
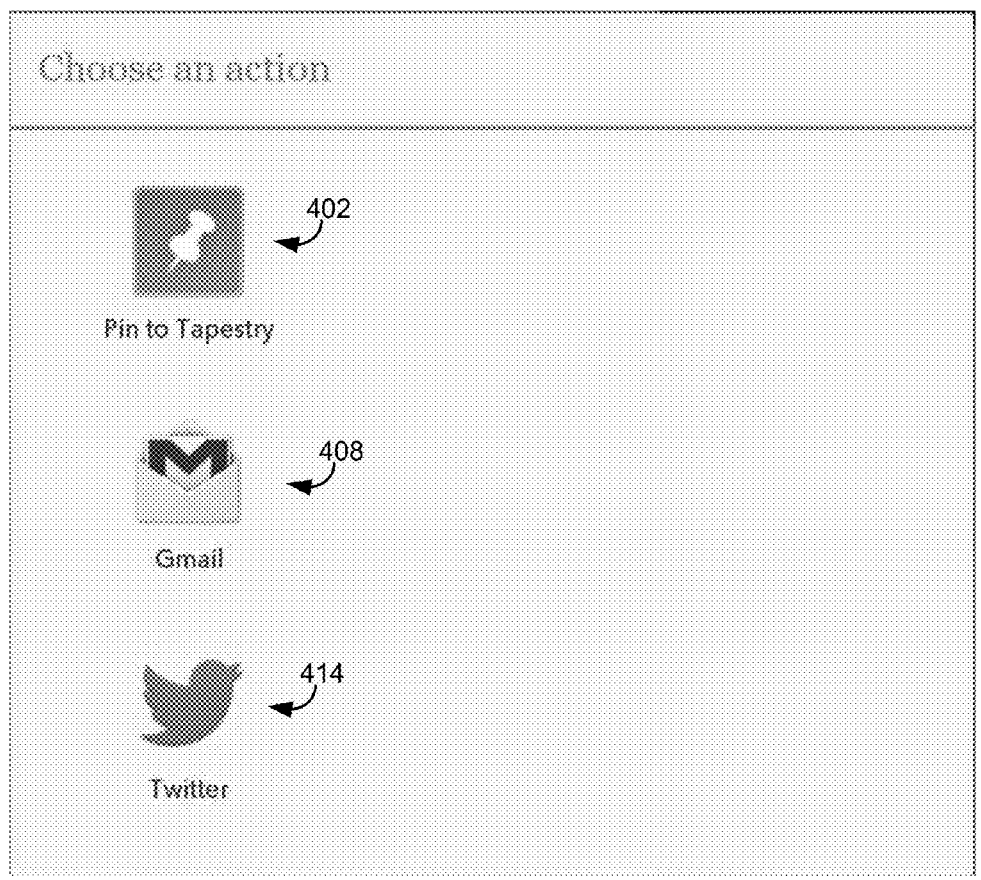
FIG. 4 shows an exemplary action dialog box operable for adding an object to a multimedia container in accordance with one embodiment of the present invention.

FIG. 4 shows an exemplary action dialog box operable for adding an object to a multimedia container in accordance with one embodiment of the present invention. FIG. 4 depicts a dialog box for sharing a piece of content or adding a piece to a multimedia container. FIG. 4 may be displayed after the selection of a share feature (e.g., share page button 312).

Exemplary dialog box 400 comprises pin to tapestry button 402, Gmail button 408, and Twitter button 414. Gmail button 408 allows a user to email a piece of content via the Gmail email service from Google Corporation of Mountain View, Calif. Twitter button 414 allows a user to submit a piece of content to the Twitter™ service from Twitter Corporation of San Francisco, Calif.

Pin to tapestry button 402 allows a user to add a piece of content to a multimedia container or tapestry. In one embodiment, in response to a selection of pin to tapestry button 402, a list of multimedia container or tapestries is displayed (e.g., FIG. 5).

Figure 5:
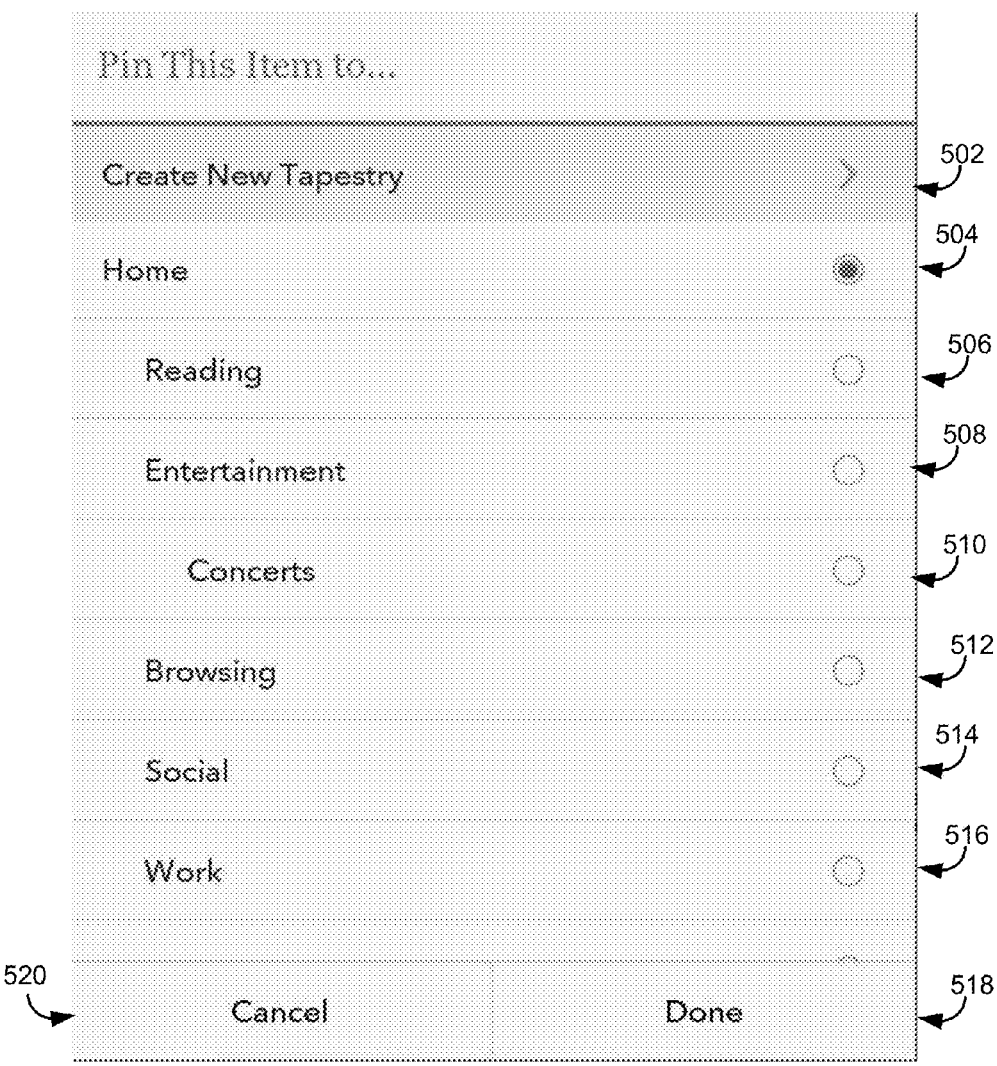
FIG. 5 shows an exemplary dialog box operable for adding an object to a new multimedia container or a selected multimedia container in accordance with one embodiment of the present invention.

FIG. 5 shows an exemplary dialog box operable for adding an object to a new multimedia container or a selected multimedia container in accordance with one embodiment of the present invention. FIG. 5 depicts a dialog box comprising selectable options for creating a new multimedia container and options for selecting a multimedia container of a list of a plurality of multimedia containers.

Exemplary dialog box 500 comprises create new tapestry button 502, selectable multimedia containers 504-516, done button 518, and cancel button 520. Done button 518 allows a user to have a piece of content added to the selected multimedia container. Cancel button 520 allows a user to cancel adding of piece of content to a multimedia container.

Figure 6A:
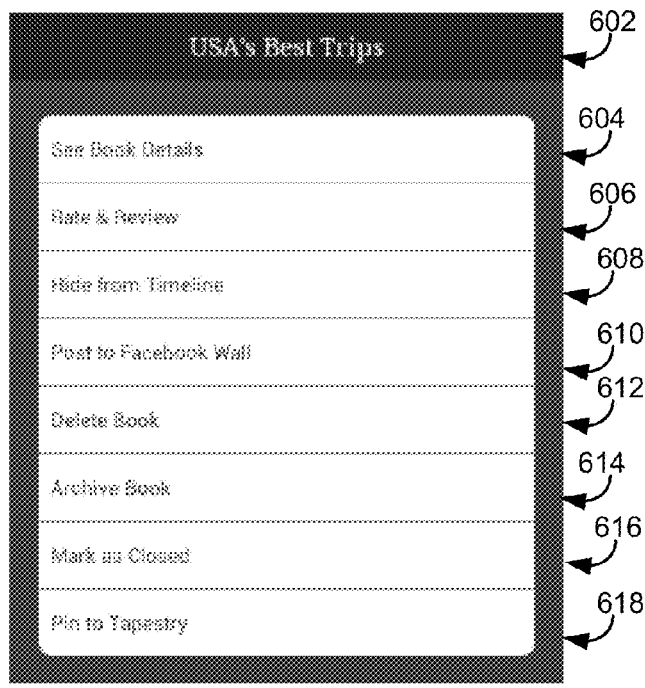
FIG. 6A shows an exemplary dialog box for operable for adding a book to a multimedia container in accordance with one embodiment of the present invention.
Figure 6B:
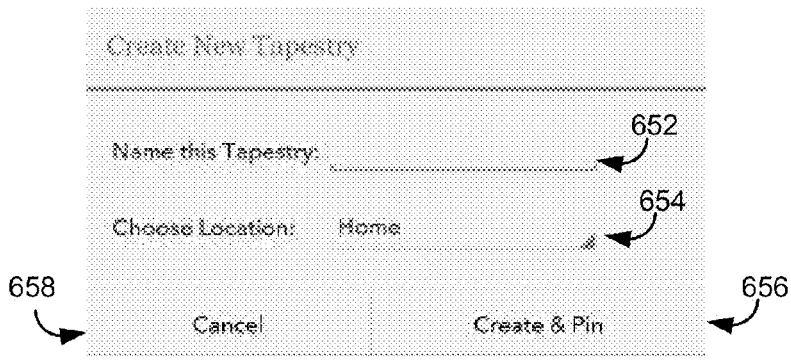
FIG. 6B shows an exemplary dialog box operable for creating a multimedia container in accordance with one embodiment of the present invention.

Create new tapestry button 502 allows a user to create a new multimedia container (e.g., via a dialog box as shown in FIG. 6B). Selection of one of selectable multimedia containers 504-516 is operable to result in a piece of content being added to the corresponding multimedia container. In one exemplary embodiment, selectable multimedia media containers 504-516 include a home multimedia container 504, a reading multimedia container 506, an entertainment multimedia container 508, a concerts multimedia container 510, a browsing multimedia container 512, a social multimedia container 514, a work multimedia container 516. In one embodiment, the multimedia containers listed are formatted according to a hierarchical configuration (e.g., with indenting). For example, the home multimedia container comprises a reading multimedia container, an entertainment multimedia container, a browsing multimedia container, a social multimedia container, and a work multimedia container. The entertainment multimedia container comprises the concerts multimedia container.

FIG. 6A shows an exemplary dialog box for operable for adding a book to a multimedia container in accordance with one embodiment of the present invention. FIG. 6a depicts an exemplary dialog box 600 displayed after a user has selected a book (e.g., pressed and held a finger on a book) in a book application. Exemplary dialog box 600 comprises actions that can be taken with respect to a book (e.g., e-book).

Exemplary dialog box 600 comprises book title 602, see book details button 604, rate and review button 606, hide from timeline button 608, post to Facebook wall button 610, delete book button 612, archive book button 614, mark as closed button 616, and pin to tapestry button 618.

Book title 602 comprises the title of the selected book. See book details button 604 allows a user to view details about the book (e.g., author, rating, reviews, and recommendation). Rate and review button 606 allows a user to rate and review the selected book. Hide from timeline button 608 allows a user to hide the selected book from a timeline. Post to Facebook wall button 610 allows a user to post information related to the selected book to the user's Facebook wall. Delete book button 612 allows a user to remove the book from their library. Archive book button 614 allows a user to archive the selected book. Mark as closed button 616 allows a user to mark the selected book as closed. Pin to tapestry button 618 allows a user to pin the selected book a tapestry or multimedia container. In one embodiment, a dialog box allowing a user to select a multimedia container or create a new multimedia container is displayed (e.g., FIG. 5) after selection of pin to tapestry button 618.

FIG. 6B shows an exemplary dialog box operable for creating a multimedia container in accordance with one embodiment of the present invention. FIG. 6B depict create new multimedia container dialog box 650 which allows a user to enter the name of the new multimedia container and select where (e.g., in which multimedia container) the new multimedia container is to be created.

Text area 652 allows a user to enter a name of a new multimedia container or tapestry (e.g., via an on-screen keyboard). Selection area 654 is operable for selection of an existing multimedia container from a list of multimedia containers that the new multimedia container will be created within. In one embodiment, selection area 654 is a drop down list of multimedia containers. Selection area 654 may indicate the hierarchical organization of the multimedia containers (e.g., as shown in FIG. 5).

The user can then select create and pin button 656 to have a new multimedia container created with the name entered in text area 652 in the multimedia container selected in selection area 654. The user can also choose cancel button 658 to cancel the creation of a multimedia container.

Figure 7:
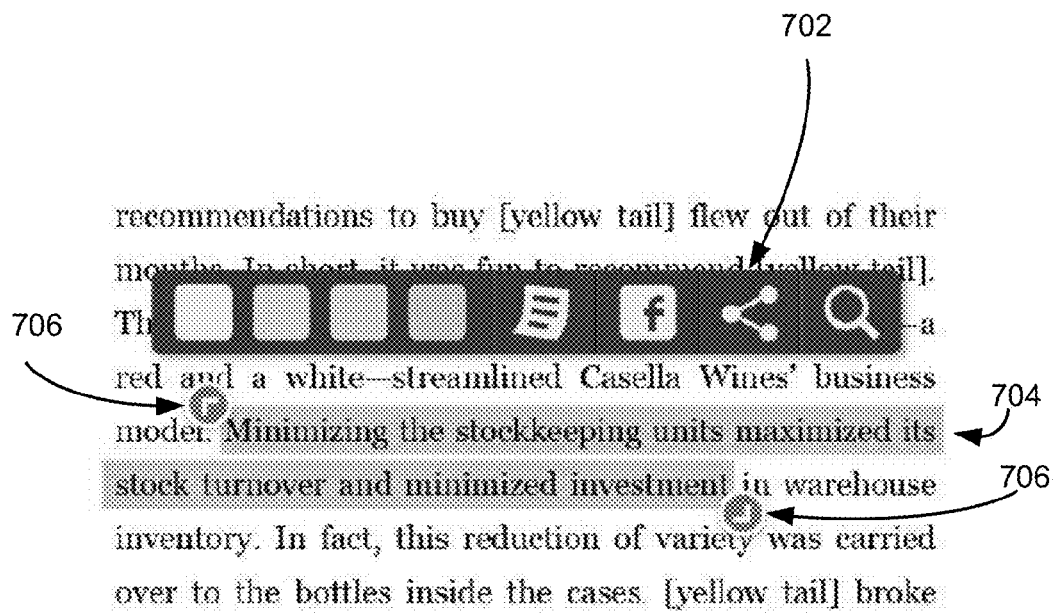
FIG. 7 shows an exemplary graphical user interface operable for adding a quotation of a multimedia container in accordance with one embodiment of the present invention.

FIG. 7 shows an exemplary graphical user interface operable for adding a quotation of a multimedia container in accordance with one embodiment of the present invention. FIG. 7 depicts exemplary graphical user interface 700 comprising selected text or quotation 704 and share button 702 operable to add quotation 704 to a multimedia container.

Exemplary graphical user interface 700 comprises share button 702, quotation 704, and brackets 706. Share button 702 allows a user to share a piece of content. In one embodiment, selection of share button 702 causes a dialog box comprising various sharing options to be displayed (e.g., FIG. 4). Brackets 706 allow a user to select a portion of text (e.g., quotation 704). In one embodiment, brackets 706 are invoked by a user pressing and holding on text.

In one embodiment, when a book is added to a multimedia container and subsequently accessed, the book is opened to the most recent page that was read. When a quotation is added to a multimedia container and subsequently accessed, the book is opened to the page the quotation is on.

Figure 8:
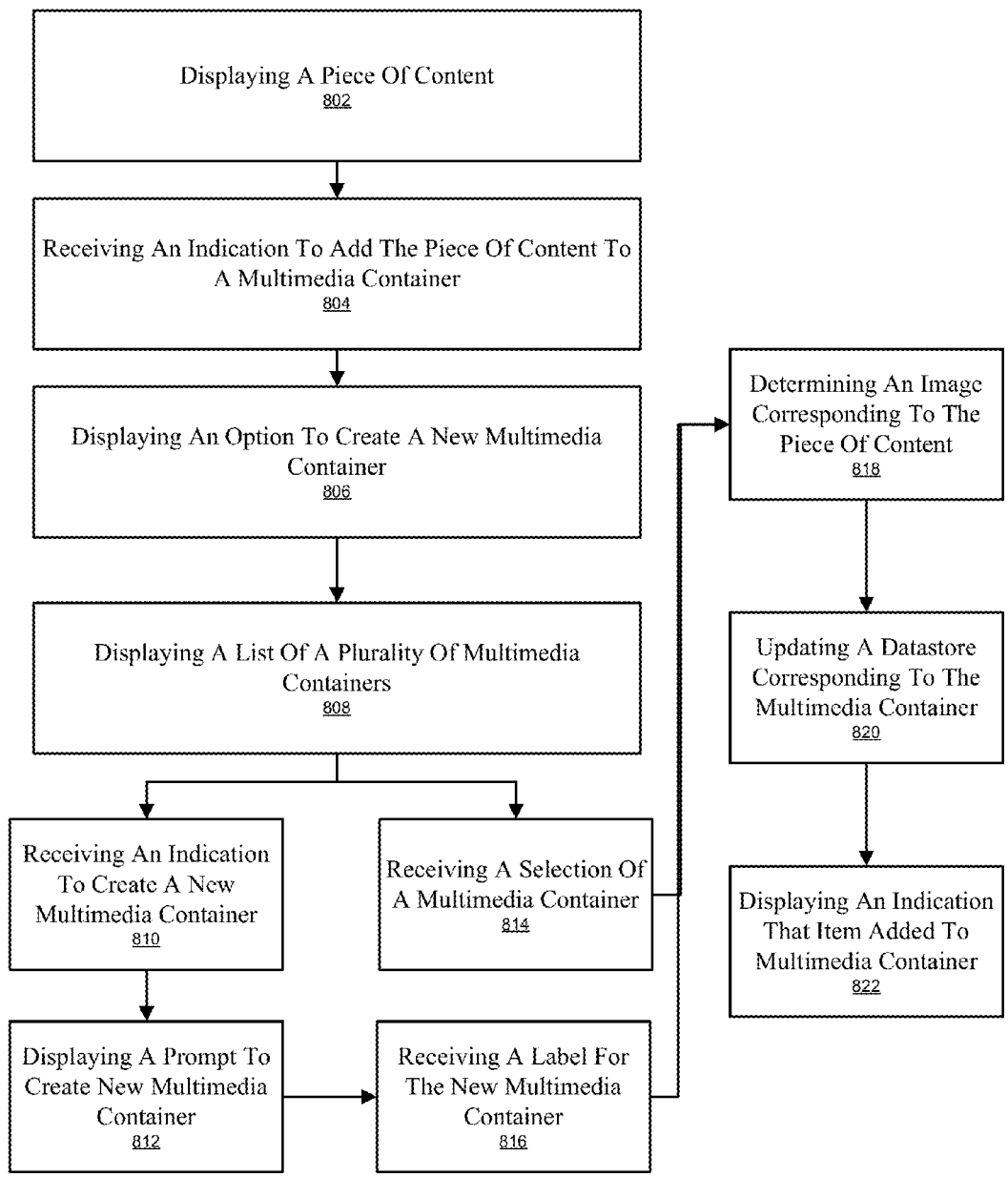
FIG. 8 shows a flowchart of an exemplary computer controlled process for adding an object to a multimedia container in accordance with one embodiment of the present invention.

With reference to FIG. 8, flowchart 800 illustrates example functions used by various embodiments of the present invention for configuration and access of memory. Although specific function blocks ("blocks") are disclosed in flowchart 800, such steps are examples. That is, embodiments are well suited to performing various other blocks or variations of the blocks recited in flowchart 800. It is appreciated that the blocks in flowcharts 800 may be performed in an order different than presented, and that not all of the blocks in flowcharts 800 may be performed.

FIG. 8 shows a flowchart of an exemplary computer controlled process for adding an object to a multimedia container in accordance with one embodiment of the present invention. FIG. 8 depicts a flowchart of a process for adding or pinning a piece of content to a multimedia or tapestry.

At block 802, a piece of content is displayed. In one embodiment, the piece of content is displayed on a mobile device (e.g., tablet computing device, smartphone, etc.).

At block 804, an indication to add the piece of content to a multimedia container is received. A multimedia container is operable to comprise a widget, an application, and/or the piece of content.

At block 806, an option to create a new multimedia container is displayed.

At block 808, displaying a list of a plurality of multimedia containers, wherein each of the multimedia containers is operable to comprise a first piece of content of a first media type and a second piece of content of a second media type. In one embodiment, the list of the plurality of multimedia containers is displayed in a hierarchical format.

At block 810, an indication to create a new multimedia container is received.

At block 812, a prompt to create a new multimedia container is displayed. In one embodiment, the prompt comprises an option to select a label of the new multimedia container.

At block 814, a selection of a multimedia container is received.

At block 816, a selected label of the new multimedia container is received.

At block 818, an image corresponding to the piece of content is determined. In one embodiment, where the piece of content is a book, the determining of the image corresponding to the piece of content comprises accessing a book cover image. In another embodiment, the determining of the image corresponding to the piece of content comprises determining a rendering of a website. In one embodiment, the determining of the image corresponding to the piece of content comprises accessing a frame of a video. In one exemplary embodiment, the image comprises an indicator of a rendering operation operable to be performed on the piece of content (e.g., a play symbol or audio symbol). Embodiments of the present invention support adding a variety of media types to a multimedia container including, but not limited to, images, books, websites, music, video, widgets, and applications.

At block 820, a datastore corresponding to the selected one of the plurality of multimedia containers is updated. In one embodiment, the adding of a piece of content to a multimedia container creates a link to that piece of content. The deleting of the piece of content from the multimedia container may just remove the link to the piece of content and not remove the piece of content (e.g., the book, image, song or other item that is linked to). For particular types of content that are added to a multimedia container, each time the piece of content is accessed via the multimedia container, an updated piece of content is displayed. For example, if a homepage of a newspaper is added to a multimedia container, each time the homepage is selected via the multimedia container, the current version of the homepage will be presented. If a link to an image is added to a multimedia container, each time the image is accessed from the multimedia container, the user is presented with the image (e.g., from the internet).

At block 822, an indication that the piece of content has been added to the selected one of the plurality of multimedia containers is displayed.

Figure 9:
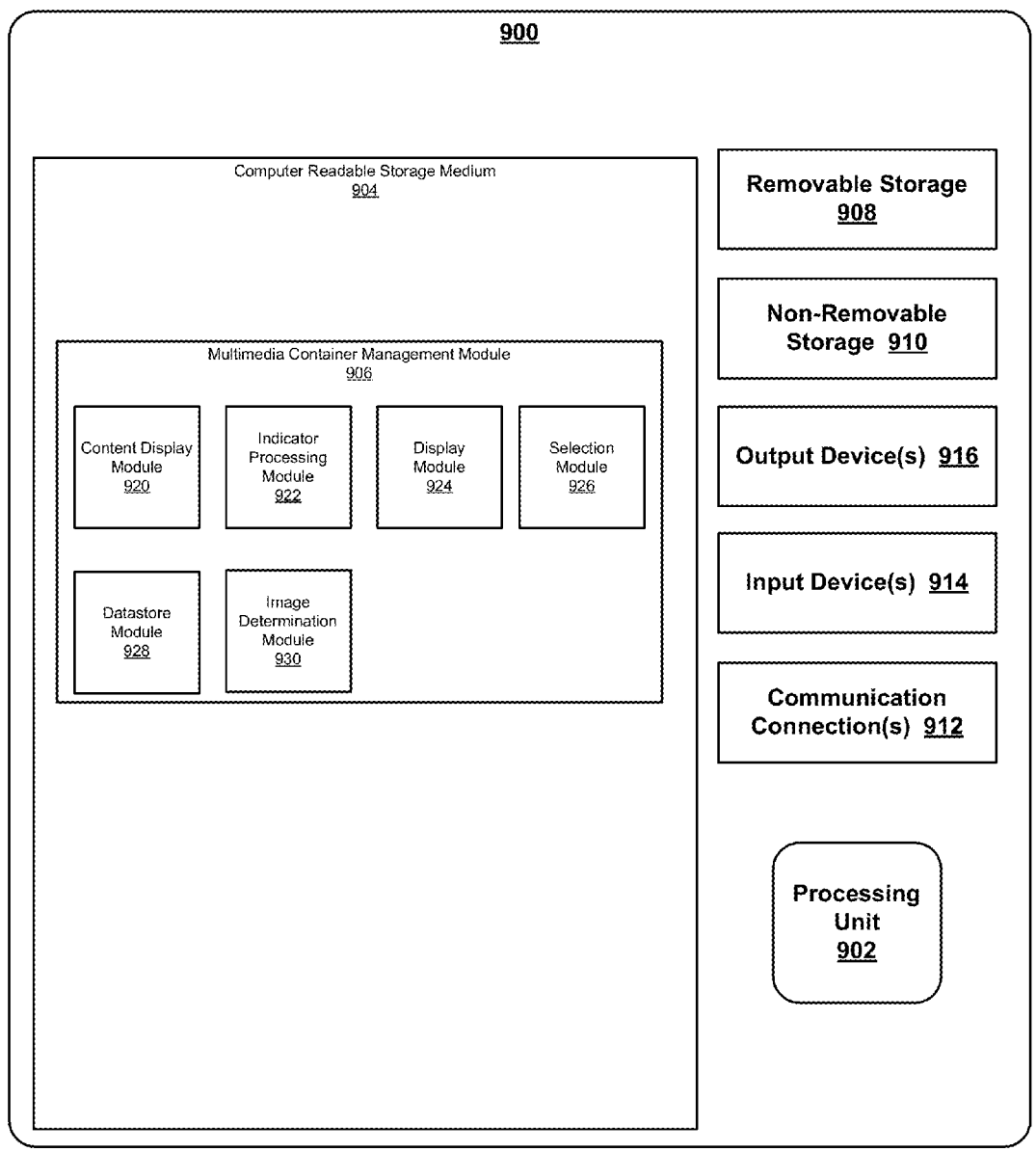
FIG. 9 shows a block diagram of exemplary computing system and corresponding modules, in accordance with one embodiment of the present invention.

FIG. 9 illustrates exemplary components used by various embodiments of the present invention. Although specific components are disclosed in computing system environment 900, it should be appreciated that such components are exemplary. That is, embodiments of the present invention are well suited to having various other components or variations of the components recited in computing system environment 900. It is appreciated that the components in computing system environment 900 may operate with other components than those presented, and that not all of the components of system 900 may be required to achieve the goals of computing system environment 900.

FIG. 9 shows a block diagram of exemplary computer system and corresponding modules, in accordance with one embodiment of the present invention. With reference to FIG. 9, an exemplary system module for implementing embodiments includes a general purpose computing system environment, such as computing system environment 900. Computing system environment 900 may include, but is not limited to, servers, desktop computers, laptops, tablet PCs, mobile devices, and smartphones. In its most basic configuration, computing system environment 900 typically includes at least one processing unit 902 and computer readable storage medium 904. Depending on the exact configuration and type of computing system environment, computer readable storage medium 904 may be volatile (such as RAM), non-volatile (such as ROM, flash memory, etc.) or some combination of the two. Portions of computer readable storage medium 904 when executed facilitate efficient execution of memory operations or requests for groups of threads.

Additionally, computing system environment 900 may also have additional features/functionality. For example, computing system environment 900 may also include additional storage (removable and/or non-removable) including, but not limited to, magnetic or optical disks or tape. Such additional storage is illustrated in FIG. 10 by removable storage 908 and non-removable storage 910. Computer storage media includes volatile and nonvolatile, removable and non-removable media implemented in any method or technology for storage of information such as computer readable instructions, data structures, program modules or other data. Computer readable medium 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 900. Any such computer storage media may be part of computing system environment 900.

Computing system environment 900 may also contain communications connection(s) 912 that allow it to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 912 may allow computing system environment 900 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 912 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 900 may also have input device(s) 914 such as a keyboard, mouse, pen, voice input device, touch input device, remote control, etc. Output device(s) 916 such as a display, speakers, etc. may also be included. All these devices are well known in the art and are not discussed at length.

In one embodiment, computer readable storage medium 904 includes multimedia container management module 906. Multimedia container management module 906 comprises content display module 920, indicator processing module 922, display module 924, selection module 926, datastore module 928, and image determination module 930.

Content display module 920 is operable to display a piece of content, wherein the content display module is operable to execute on a mobile device. Indicator processing module 922 is operable to receive an indication the piece of content is to be added to a subsequently identified multimedia container. Display module 924 is operable to display a list of a plurality of multimedia containers. In one embodiment, the list of the plurality of multimedia containers is in a hierarchical format corresponding to a hierarchy of the plurality of multimedia containers. Selection module 926 is operable to receive an indication identifying a selected multimedia container. Datastore module 928 is operable to update a datastore corresponding to the selected multimedia. Image determination module 930 is operable to an image corresponding to the piece of content. In one embodiment, image determination module 930 is operable to access a book cover image when the piece of content is a book.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
rendering a graphical user interface (GUI) for presenting a piece of content on a mobile device using an application program configured to execute said piece of content, wherein said GUI comprises a visual object, and wherein the visual object includes at least one of an image in a web browser, a book in a book application, and text of an application;
receiving a first user interaction with said visual object, wherein said first user interaction prompts a dialog box to be displayed at the GUI, wherein said dialog box includes content adding options and content sharing options;
receiving a second user interaction with said dialog box indicating that said piece of content being presented is to be added to a subsequently identified multimedia container;
responsive to said second user interaction, displaying a list of a plurality of multimedia containers, wherein each of said multimedia containers is configured to comprise a plurality of media types;
receiving an indication identifying a selected multimedia container from said plurality of multimedia containers;
determining an image corresponding to said piece of content;
displaying an indication that said piece of content has been added to said selected one of said plurality of multimedia containers;
receiving a third user interaction with said selected multimedia container indicating that said text of the application is being accessed; and
responsive to said third user interaction, displaying said text of the application via the application.

2. The method as described in claim 1, further comprising:
modifying a datastore corresponding to said selected multimedia container.

3. The method as described in claim 1, wherein said determining of said image corresponding to said piece of content comprises accessing a book cover image.

4. The method as described in claim 1, wherein said determining of said image corresponding to said piece of content comprises determining a rendering of a website.

5. The method as described in claim 1, wherein said mobile device is a tablet computing device.

6. The method as described in claim 1, wherein said selected multimedia container comprises an application.

7. The method as described in claim 1, wherein said selected multimedia container comprises a widget.

8. The method as described in claim 1, wherein said list of said plurality of multimedia containers is in a hierarchical format.

9. The method as described in claim 1, wherein said dialog box includes content sharing options via at least one of a text message, an email, and a social network.

10. The method as described in claim 1, wherein the text of the application includes a quotation from a book and the book is opened to the page of the book that the quotation is on when the quotation is accessed at said selected multimedia container.

11. A non-transitory computer-readable medium having stored thereon, computer executable instruction that, if executed by a computer system cause the computer system to perform a method comprising:
   rendering a graphical user interface (GUI) for presenting a piece of content on the computer system using an application program configured to execute said piece of content, wherein said GUI comprises a visual object, and wherein the visual object includes at least one of an image in a web browser, a book in a book application, and text of an application;
   receiving a first user interaction with said visual object, wherein said user interaction prompts a dialog box to be displayed at the GUI, wherein said dialog box includes content adding options and content sharing options;
   receiving a second user interaction with said dialog box indicating that said piece of content being presented is to be added to a subsequently identified multimedia container;
   responsive to said second user interaction, displaying an option to create a multimedia container;
   receiving an indication to create said multimedia container, wherein said multimedia container comprises a plurality of media types;
   displaying an option to select a label of said multimedia container;
   receiving an indication of a selected label of said multimedia container;
   determining an image corresponding to said piece of content;
   storing said selected label of said new multimedia container and said image into a datastore corresponding to said multimedia container;
   receiving a third user interaction with said multimedia container indicating that said text of the application is being accessed; and
   responsive to said third user interaction, displaying said text of the application via the application.

12. The non-transitory computer-readable storage medium as described in claim 11, further comprising:
   displaying a list of a plurality of multimedia containers.

13. The non-transitory computer-readable storage medium as described in claim 12, wherein said list of said plurality of multimedia containers is in a hierarchical format.

14. The non-transitory computer-readable medium as described in claim 11, wherein said determining of said image corresponding to said piece of content comprises accessing a book cover image.

15. The non-transitory computer-readable storage medium as described in claim 11, wherein said determining of said image corresponding to said piece of content comprises accessing a frame of a video.

16. The non-transitory computer-readable storage medium as described in claim 11, wherein said determining of said image corresponding to said piece of content comprises determining a rendering of a website.

17. The non-transitory computer-readable storage medium as described in claim 16, wherein said image comprises an indicator of a rendering operation to be performed on said piece of content.

18. The non-transitory computer-readable storage medium as described in claim 11, wherein said mobile device is a tablet.

19. A system comprising:
   a processor; and
   a memory coupled to said processor and comprising instructions executable by said processor to:
      render a graphical user interface (GUI) for presenting a piece of content using an application program configured to execute said piece of content, wherein said GUI comprises a visual object, and wherein the visual object includes at least one of an image in a web browser, a book in a book application, and text of an application;
      receive a first indication from said visual object of said GUI, wherein said first indication prompts a dialog box including content adding options and content sharing options to be displayed at the GUI, and a second indication from said dialog box of said GUI indicates that said piece of content being presented is to be added to a subsequently identified multimedia container;
      display a list of a plurality of multimedia containers upon receiving said second indication;
      determine an image corresponding to said piece of content;
      receive a third indication identifying a selected multimedia container;
      update a datastore corresponding to said selected multimedia;
      receive a user interaction with said selected multimedia container indicating that said text of the application is being accessed; and
      responsive to said third user interaction, displaying said text of the application via the application.

20. The system as described in claim 19, wherein said list of said plurality of multimedia containers is in a hierarchical format corresponding to a hierarchy of said plurality of multimedia containers.

21. The system as described in claim 19, wherein said instructions are further executable by said processor to access a book cover image when said piece of content is a book.

* * * * *